United States Patent [19]

Kaiser et al.

[11] Patent Number: 5,037,247

[45] Date of Patent: Aug. 6, 1991

[54] POWDER PUMP WITH INTERNAL VALVE

[75] Inventors: Thomas A. Kaiser, Vermilion; Lloyd Lafferty, North Canton, both of Ohio

[73] Assignee: Nordson Corporation, Westlake, Ohio

[21] Appl. No.: 442,730

[22] Filed: Nov. 29, 1989

[51] Int. Cl.[5] .................. B65G 53/14

[52] U.S. Cl. .................. 406/153; 417/198

[58] Field of Search .................. 406/153, 144, 141; 417/107, 198, 182

[56] References Cited

U.S. PATENT DOCUMENTS

| | | | |
|---|---|---|---|
| 445,831 | 2/1891 | Desmond | 417/187 |
| 1,889,163 | 11/1932 | Vogel-Jorgensen | 406/153 |
| 2,818,121 | 12/1957 | Clifford et al. | 169/9 |
| 2,880,036 | 3/1959 | Larsson et al. | 302/17 |
| 2,987,007 | 6/1961 | Conkling | 103/271 |
| 3,441,045 | 4/1969 | Malone | 417/187 |
| 3,746,254 | 7/1973 | Duncan et al. | 239/115 |
| 3,870,375 | 3/1975 | Duncan et al. | 302/42 |
| 3,960,323 | 6/1976 | Duncan et al. | 239/15 |
| 4,105,256 | 8/1978 | Parker et al. | 406/153 |
| 4,248,379 | 2/1981 | Hollstein et al. | 239/1 |
| 4,408,961 | 10/1983 | Laybourne | 417/189 |
| 4,586,854 | 5/1986 | Newman et al. | 406/153 |
| 4,600,363 | 7/1986 | Ise et al. | 417/187 |
| 4,615,649 | 10/1986 | Sharpless | 406/138 |
| 4,715,535 | 12/1987 | Mulder | 239/1 |
| 4,770,344 | 9/1988 | Kaiser | 239/124 |
| 4,824,295 | 4/1989 | Sharpless | 406/153 |
| 4,846,617 | 7/1989 | Ehrhardt | 417/187 |

*Primary Examiner*—Joseph F. Peters, Jr.

*Assistant Examiner*—Christopher P. Ellis

*Attorney, Agent, or Firm*—Wood, Herron & Evans

[57] ABSTRACT

A powder pumping apparatus including a pump body formed with a pumping chamber having a venturi passageway, a suction tube intersecting the pumping chamber and an air nozzle including a valve mechanism which discharges pressurized air directly into the venturi passageway of the pumping chamber to create a vacuum within the pumping chamber and suction tube to withdraw particulate powder material from a powder feed hopper. The air nozzle is carried within the interior of the pump body and has a discharge outlet located within the pumping chamber which discharges a substantially constant pressure pulse of air directly into the venturi passageway of the pumping chamber. In turn, a sharp, well-defined powder pulse is produced having a substantially homogeneous powder-to-air density throughout the duration of the pulse.

19 Claims, 1 Drawing Sheet

POWDER PUMP WITH INTERNAL VALVE

FIELD OF THE INVENTION

This invention relates to powder pumping apparatus, and, more particularly, to a powder pump having a venturi pumping chamber and an internal nozzle including a valve which discharges pressurized air into the venturi pumping chamber to create a suction therein for withdrawing particulate powder material from a powder source.

BACKGROUND OF THE INVENTION

One type of apparatus for supplying particulate powder material to dispensing devices such as powder spray guns includes a powder feed hopper having a fluidized bed carrying particulate powder material, and a powder pump mounted exteriorly of the feed hopper. The powder pump is effective to withdraw particulate powder material from the fluidized bed through a siphon tube connected to the inlet of a venturi pumping chamber within the body of the powder pump. A flow of relatively low pressure air is directed into the venturi pumping chamber from an inlet in the pump body which creates a vacuum or suction within the pumping chamber, and, in turn, the siphon tube, to withdraw particulate powder material from the feed hopper. The powder material is entrained in air in the course of movement into the venturi pumping chamber, and this air-entrained powder stream is then directed to a powder dispensing device such as a spray gun for application onto a substrate.

A number of applications require the intermittent supply of particulate powder material to spray guns or other dispensing devices instead of a continuous flow of powder material. In these applications, the flow of pressurized air into the venturi pumping chamber of the powder pump which creates a suction therein must be pulsed or intermittently interrupted so that the powder material is withdrawn from the feed hopper at selected intervals or pulses for supply to the powder spray device. In many powder pump designs, an intermittent supply of pressurized air to the venturi pumping chamber is obtained by operation of the valve located in a relatively long air supply line which is connected between an inlet to the pump body and a source of pressurized air. The valve is intermittently moved between an open position to permit the passage of pressurized air from the valve, through the air supply line to the powder pump, and a closed position to prevent the passage of air therethrough.

Powder pumping apparatus of the type described above have a serious deficiency in applications wherein it is desired to supply powder intermittently to powder dispensing devices. It has been observed that the relatively large open space or "dead zone" contained in that portion of the air supply tube which extends between the valve and the inlet to the pump body results in the production of uneven powder pulses from the powder pump. It is believed that such uneven powder pulses can be attributed to a "tailing" effect created by the air supply line wherein a large amount of air pressure is produced at the beginning of an air pulse, i.e., when the valve is opened to introduce pressurized air through the air supply line into the venturi pumping chamber of the powder pump, and then a gradual tapering off of the air pressure occurs at the end of a pulse when the valve is closed. This surge of high pressure air at the beginning of a pulse and tapering off of the air pressure at the end of a pulse produces a powder pulse or cloud having a "tear drop" shape, wherein a denser powder cloud having a relatively high ratio of powder-to-air is produced at the beginning of the powder pulse and a significantly less dense powder cloud having a comparatively low ratio of powder-to-air is produced at the end of the powder pulse thus forming the "tail portion" of the tear drop shape cloud.

In many powder spraying applications, it is desirable to produce a sharp, well-defined powder pulse having a substantially homogeneous powder-to-air density throughout the duration of the pulse. The "tear drop" shaped powder pulse, with a greater concentration of powder at the beginning of the pulse than at the end, is unacceptable for such applications.

SUMMARY OF THE INVENTION

It is therefore among the objectives of this invention to provide a powder pumping apparatus which is capable of producing a powder pulse having a homogeneous powder-to-air density throughout the duration of the pulse, and which produces a sharp, well-defined powder pulse.

These objectives are accomplished in a powder pumping apparatus comprising a pump body formed with a pumping chamber having a venturi passageway, a suction tube intersecting the pumping chamber and an air nozzle including a valve mechanism which discharges pressurized air directly into the venturi passageway of the pumping chamber to create a vacuum within the pumping chamber and suction tube to withdraw air-entrained powder material from a powder feed hopper. The air nozzle is carried within the interior of the pump body and has a discharge outlet located within the pumping chamber which discharges a substantially constant pressure pulse of air directly into the venturi passageway of the pumping chamber. In turn, a sharp, well-defined powder pulse is produced having a substantially homogeneous powder-to-air density throughout the duration of the pulse.

This invention is predicated upon the concept of locating the discharge outlet of an air nozzle immediately adjacent or within the pumping chamber in the body of a powder pump to eliminate the long "dead zone" present in powder pump designs of the type described above. The air nozzle is formed with an air chamber which is continuously supplied with pressurized air from a source. In response to operation of a valve mechanism carried within the nozzle, sharp, well-defined pulses of pressurized air are ejected from the discharge outlet of the air nozzle directly into the pumping chamber in the pump body. As a result, a powder pulse having a substantially homogeneous powder-to-air density is produced, thus eliminating the "tailing effect" experienced in other powder pump designs wherein the powder pulse is denser at the beginning of the pulse but then lessens or tails off at the end.

In the presently preferred embodiment, the air nozzle comprises a nozzle body insertable within the pump body opposite the venturi passageway of the pumping chamber. The air nozzle is formed with a stepped throughbore defining the air chamber which is formed with a discharge outlet at one end. The air chamber is connected to a source of pressurized air which maintains the air chamber at substantially constant pressure. A seat is located at the discharge outlet of the air chamber which is adapted to receive the tip of a plunger. This plunger is carried by an armature which is slidable within the stepped throughbore in the nozzle body. A solenoid is operative to move the armature in a first direction, which, in turn, moves the plunger to an open position wherein the plunger tip is spaced from the seat allowing pressurized air within the air chamber to be ejected from the discharge outlet of the nozzle body into the venturi passageway of the pumping chamber in the pump body. In order to terminate this pulse of pressurized air, powder to the solenoid is interrupted allowing a return spring connected to the plunger to force the plunger and armature in an opposite, second direction so that the plunger tip contacts the seat and seals the air chamber.

Preferably, in the closed position of the plunger, a small gap is formed between a ring on the plunger and a flange formed in the armature. In response to activation of the solenoid, the armature travels in the first direction and moves a slight distance before contacting the ring of the plunger. This helps the armature gain momentum before contacting the plunger ring, and thus ensures that the plunger is positively and quickly moved in the first direction to unseat the plunger tip from the seat at the discharge outlet of the nozzle body.

An important advantage of this invention is the formation of a powder pulse in which the powder-to-air density of each intermittent pulse is substantially homogeneous throughout the duration of the pulse. By locating the air discharge outlet of the air nozzle immediately adjacent or within the pumping chamber, the pulsed bursts of pressurized air from the air nozzle are supplied to the pumping chamber with little or no delay and with little or no variation in pressure from the beginning of the pulse to the end of the pulse. As a result, the suction force created within the pumping chamber which draws particulate powder material through the suction inlet thereto is substantially constant and sharply defined. This produces a homogeneous, well-defined powder pulse for ejection through the venturi passageway of the pumping chamber in the pump body.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
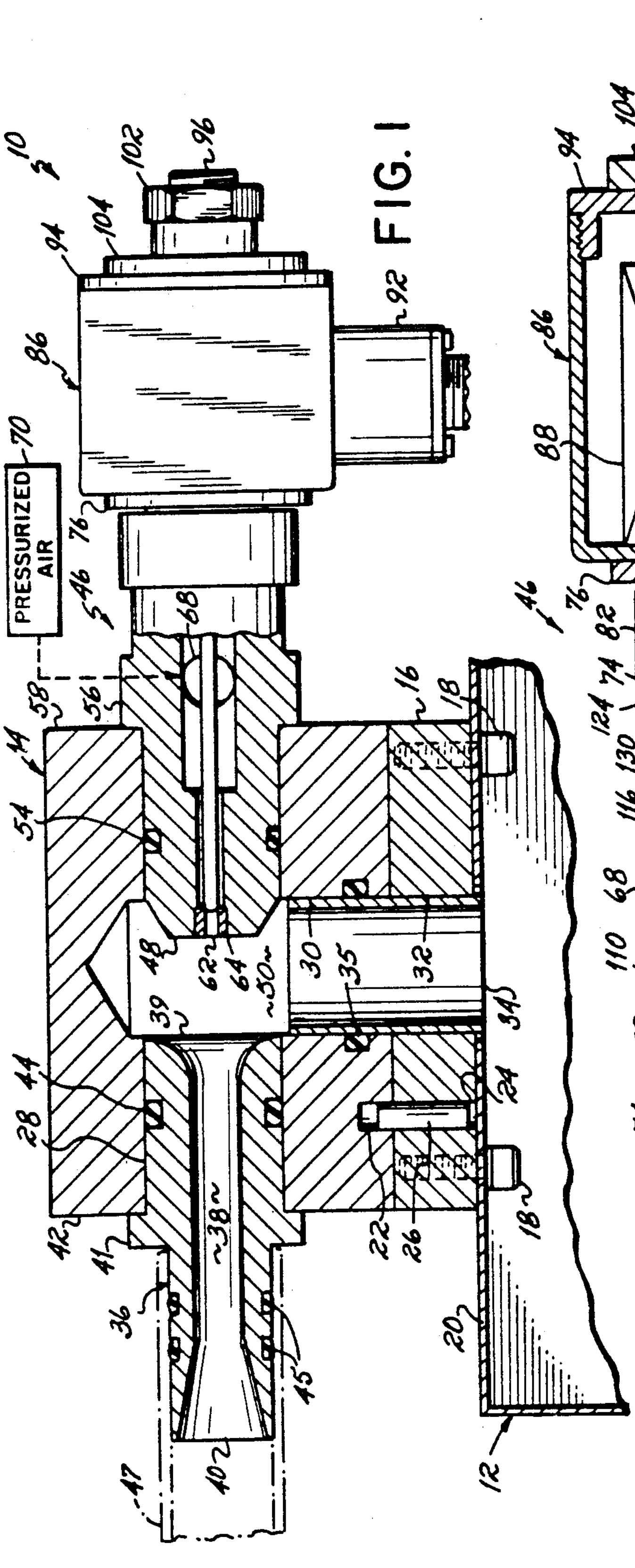
FIG. 1 is an elevational view in partial cross section of the powder pumping apparatus of this invention.

Referring now to the Figures, a powder pumping apparatus 10 is shown mounted to a powder supply hopper 12 having a fluidized bed (not shown) for supporting particulate powder material. The construction of the hopper 12 forms no part of this invention per se, and typical examples of same are disclosed in U.S. Pat. Nos. 4,586,854 and 4,615,649, the disclosures of which are incorporated by reference in their entireties herein.

The powder pumping apparatus 10 includes a pump body 14 which rests atop a mounting plate 16 connected by screws 18 to the top wall 20 of the powder supply hopper 12. Preferably, the pump body 14 is formed with a bore 22 which aligns with a bore 24 formed in the mounting plate 16 so that an alignment peg 26 can be inserted therebetween to facilitate assembly of body 14 atop the mounting plate 16.

The pump body 14 is formed with a throughbore 28 which is intersected at a right angle by a transverse bore 30. This transverse bore 30 in the pump body 14 aligns with a bore 32 in the mounting plate 16, and these bores 30, 32 together receive a suction tube 34. The suction tube 34 is held in place and sealed within bore 30 by an O-ring 35, and extends downwardly from the throughbore 28 in the pump body 14 to the interior of the powder supply hopper 12 to withdraw particulate powder material from the hopper 12 into the powder pumping apparatus 10.

The lefthand portion of the throughbore 28 in pump body 14, as viewed in FIG. 1, receives a block 36 formed with a venturi passageway 38 having an inlet 39 and an outlet 40. The block 36 is formed with a projection 41 which engages a face 42 of the pump body 14 with the block 36 in a fully seated position within the interior of throughbore 28. The block 36 is held in place within passageway 28 by an O-ring 44 carried on the block 36, which also creates a seal between the block 36 and the inner wall of the pump body 14. The opposite end of the block 36 carries a pair of O-rings 45 which are adapted to mount to the internal wall of a supply line 47 connected to a powder dispensing device (not shown).

The righthand portion of the throughbore 28 in pump body 14 mounts an air nozzle 46 described in detail below. This air nozzle 46 has an inner end 48 which is spaced from the inlet 39 of the venturi passageway 38 in the block 36, thus defining a pumping chamber 50 within a portion of the interior of the throughbore 28 in pump body 14 which also includes the venturi passageway 38 in block 36. As described in more detail below, the air nozzle 46 is effective to discharge intermittent pulses or a continuous stream of pressurized air into the pumping chamber 50 toward the inlet 39 of its venturi passageway 38 which creates a suction or vacuum within the pumping chamber 50 and, in turn, within the suction tube 34. This suction force is effective to draw air-entrained powder material from the hopper 12 through the suction tube 34, and then through the pumping chamber 50 and its venturi passageway 38 into the supply line 47 to a powder dispensing device.

Figure 2:
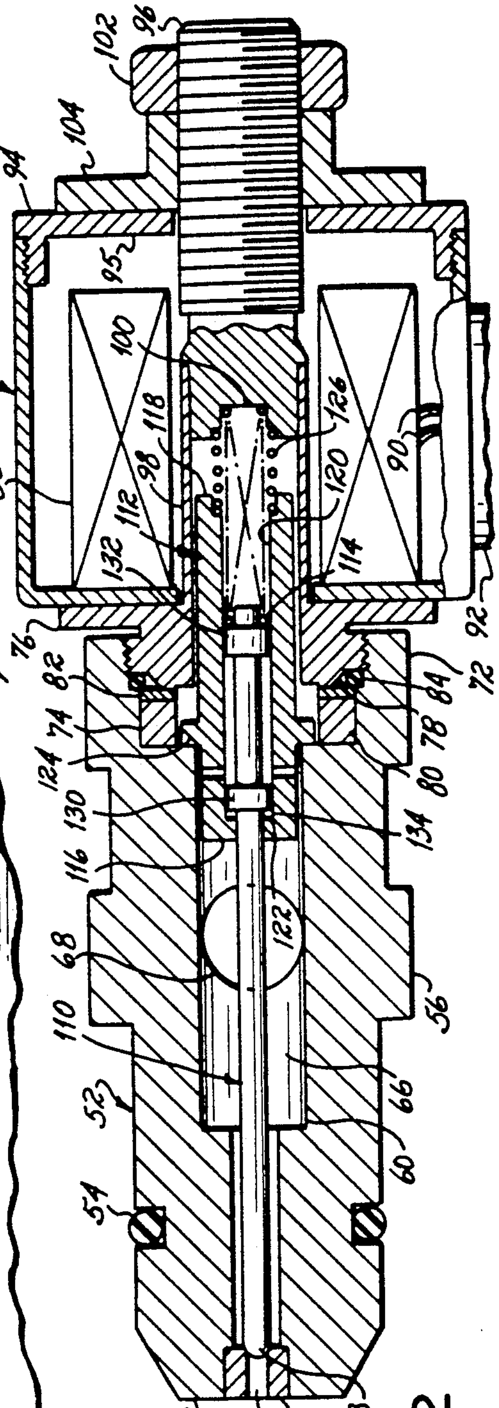
FIG. 2 is an enlarged cross sectional view of the air nozzle associated with a powder pumping apparatus.

Referring now to FIG. 2, the construction of air nozzle 46 is illustrated in detail. The air nozzle 46 comprises a nozzle body 52, a portion of which is insertable within the righthand side of the throughbore 28 in pump body 14 so that the inner end 48 of the nozzle body 52 extends immediately adjacent to or within the pumping chamber 50. An O-ring 54 is carried by the nozzle body 52 to hold it in place within the pump body 14, and to create a seal with the internal wall formed by throughbore 28. An extension 56 is formed on the nozzle body 52 which engages a face 58 of pump body 14 with the nozzle body 52 in a fully seated position within the interior of the throughbore 28. See FIG. 1.

The nozzle body 52 is formed with a stepped throughbore 60 which terminates in a discharge outlet 62 at the inner end 48 of the air nozzle 46. A seat 64, preferably formed of a hardened material such as carbide steel, is mounted in the nozzle body 52 at the discharge outlet 62 of stepped throughbore 60. The stepped throughbore 60 defines an air chamber 66 which is connected by an inlet 68 to a source of pressurized air 70, illustrated schematically in FIG. 1. The air source 70 is effective to continuously supply pressurized air into the air chamber 66 to maintain the interior pressure of the air chamber 66 substantially constant throughout operation of the apparatus 10. For purposes of the present discussion, the term "inner" as used herein refers to the lefthand side of the air nozzle 46 as viewed in the Figures, and the term "outer" refers to the righthand side of the air nozzle 46 as viewed in the Figs.

The outer end of the nozzle body 52 is formed with a flange 72, and an annular recess 74 located inwardly from the flange 72. The flange 72 is formed with internal threads which mate with the external threads of a sleeve 76 having an inner end 78. An annular insert 80 formed of an insulative material such as Teflon, and a steel ring 82, are both carried within the annular recess 74 of flange 72 and held in place by engagement of the steel ring 82 with the inner end 78 of sleeve 76. Additionally, an O-ring 84 is interposed between the inner end 78 of sleeve 76 and the steel ring 82 to create a seal therebetween.

The sleeve 76 mounts a solenoid housing 86 which carries in its interior a solenoid 88. The solenoid 88 receives power from leads 90 extending through a fitting 92 connected to the side wall of the solenoid housing 86. The outer end of the solenoid housing 86 mounts an end plate 94 having a central bore 95 which receives a threaded stud 96. The inner portion of the threaded stud 96 has an outer surface fixedly connected by brazing, welding or the like to an elongated, annular wall 98 integrally formed in the sleeve 76. The inner end of the threaded stud 96 is formed with a recess 100. In order to mount the solenoid housing 86 to the sleeve 76, a nut 102 is threaded onto the threaded stud 96 and tightened down onto the end of a cap 104 which rests against the end plate 94 connected to solenoid housing 86.

The function of air nozzle 46 is to introduce intermittent pulses, or, alternatively, a continuous stream, of pressurized air into the pumping chamber 50 of pump body 14. This is achieved by operation of a valve mechanism which includes a plunger 110, an armature 112, a return spring 114 and the solenoid 88. As viewed in FIG. 2, the armature 112 is essentially tubular in shape having an inner end 116 carried within the outer portion of the air chamber 66, and an outer end 118 carried within the sleeve 76. The armature 112 is formed with a throughbore 120 and a radially inwardly extending, annular shoulder 122 at its inner end 116. An extension 124 is formed at the outer wall of armature 112 which is engagable with a wall of nozzle body 52 formed by the annular recess 74. Preferably, a biasing spring 126 is interposed between the outer end 118 of armature 112 and the inner end of the threaded stud 96, for purposes to become apparent below.

The plunger 110 extends from the armature 112 at its outer end, through the air chamber 66 to the seat 64 at the discharge outlet 62 of air chamber 66. The inner end of plunger 110 is formed with a tip 128 which is formed to mate with the seat 64. The outer portion of plunger 110 mounts a ring 130 engagable with the annular shoulder 122 of armature 112, and a mounting plate 132 connected to one end of the return spring 114. The opposite end of the return spring 114 is mounted within the recess 100 formed in the threaded stud 96.

The air nozzle 46 of this invention operates as follows. In the closed position illustrated in FIG. 2, the return spring 114 biases the plunger 110 in an inward direction such that the plunger tip 128 rests against the seat 64, thus closing discharge outlet 62. Importantly, the air chamber 66 within the nozzle body 52 is continuously supplied with pressurized air from source 70 through inlet 68 so that the pressure within air chamber 66 is substantially constant. In order to move the plunger tip 128 in an outward direction, away from seat 64, energy is supplied to the solenoid 88 which moves the armature 112 outwardly or to the right as viewed in the Figures. As seen in FIG. 2, a small space or gap 134 is provided between the annular shoulder 122 in the armature 112 and the ring 130 carried on plunger 110 so that the armature 112 is permitted to move a short distance outwardly before its annular shoulder 122 engages the ring 130. This allows the armature 112 to gain momentum before the annular shoulder 122 contacts the ring 130, thus ensuring that the plunger 110 is moved quickly and forcefully in an outward direction to quickly unseat the plunger tip 128 from the seat 64. With the plunger 110 in an open position, pressurized air within the air chamber 66 is allowed to pass through the discharge outlet 62 and enter the pumping chamber 50 toward its venturi passageway 38. As shown in FIG. 1, the discharge outlet 62 is located directly in the line with the inlet 39 of venturi passageway 38 to create an effective vacuum within the pumping chamber 50 and, in turn, within the suction tube 34.

When it is desired to terminate the pulse of pressurized air, the solenoid 88 is de-energized, allowing the return spring 114 to move the plunger tip 128 inwardly to a seated position upon the seat 64. In order to ensure that the armature 112 also returns to its fully inward position, the biasing spring 126 is effective to urge the armature 112 inwardly and thus maintain the gap 134 between the annular shoulder 122 of armature 112 and the ring 130 of plunger 110.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of this invention without departing from the essential scope thereof.

For example, in the illustrated embodiment, a solenoid 88 and return spring 114 are employed to effect movement of the plunger 110 between an open and closed position. It is contemplated that movement of the plunger 110 could be effected by other means, e.g., pneumatically or the like. In any event, movement of the plunger 110 is obtained independently of the pressure within the air chamber 66, i.e., the structure which moves the plunger 110 functions independently of any force exerted on the plunger 110 and/or armature 112 by the pressurized air within the air chamber 66.

Therefore, it is intended that the invention not be limited to the particular embodiment disclosed as the best mode contemplated for carrying out this invention, but that the invention will include all embodiments falling within the scope of the appended claims.

We claim:

1. Apparatus for pumping powder material from a powder source, comprising:

a pump body formed with a pumping chamber having a powder inlet adapted to communicate with the powder source, and a powder outlet;

nozzle means adapted to be connected to a source of pressurized air for ejecting pressurized air into said pumping chamber;

means for periodically interrupting the passage of pressurized air through said nozzle means into said pumping chamber of said pump body to form intermittent pulses of pressurized air each having a substantially constant pressure for the duration of a pulse, said intermittent pulses of pressurized air being effective to withdraw powder material from the powder source through said powder inlet and to form pulses of air-entrained powder material having a substantially homogeneous air-to-powder density.

2. Apparatus for pumping powder material from a powder source, comprising:

a pump body formed with a pumping chamber having a powder inlet adapted to communicate with the powder source, and a powder outlet;

a nozzle formed with an air chamber adapted to receive pressurized air, said air chamber being formed with a discharge outlet;

said nozzle being carried by said pump body so that said discharge outlet is positioned to eject pressurized air from said air chamber in said nozzle into said pumping chamber of said pump body which creates a suction in said pumping chamber to draw particulate powder material from the powder source into said powder inlet of said pumping chamber and through said powder outlet thereof;

said nozzle including means for periodically interrupting the passage of pressurized air through said discharge outlet in said nozzle into said pumping chamber of said pump body to form intermittent pulses of pressurized air each having a substantially constant pressure for the duration of a pulse, said intermittent pulses of pressurized air being effective to withdraw powder material from the powder source through said powder inlet and to form pulses of air-entrained powder material having a substantially homogeneous air-to-powder density.

3. The apparatus of claim 2 in which said pump body is formed with a throughbore, a portion of said throughbore defining at least a portion of said pumping chamber, said nozzle comprising:

a nozzle body formed with said air chamber and said discharge outlet, said nozzle body being insertable within said throughbore in said pump body so that said discharge outlet thereof is located at said pumping chamber;

a seat mounted within said air chamber of said nozzle body at said discharge outlet therein;

a plunger having a tip, said plunger being movable between an open position wherein said tip is spaced from said seat and a closed position wherein said tip contacts said seat to seal said discharge outlet;

means for moving said plunger between said open and closed positions.

4. The apparatus of claim 3 in which said means for moving said plunger comprises:

an armature slidably mounted within said nozzle body, said armature being engagable with said plunger;

a solenoid operative to move said armature in a first direction, said armature being effective in the course of moving in said first direction to move said plunger to said open position;

a return spring connected to said plunger, said return spring being effective to move said plunger in a second direction to said closed position.

5. The apparatus of claim 4 in which said armature is formed with an annular shoulder and said plunger is formed with a ring, said annular shoulder being effective to engage said ring to move said plunger to said open position.

6. The apparatus of claim 5 in which said nozzle body includes a spring for biasing said armature to a first position when said plunger is in said closed position, said annular shoulder of said armature being spaced from said ring of said plunger with said armature in said first position.

7. Apparatus for pumping powder material from a powder source, comprising:

a pump body, said pump body being formed with a powder pumping chamber having a venturi outlet;

a nozzle formed with an air chamber adapted to receive pressurized air, said air chamber being formed with a discharge outlet which is positioned within said pump body in alignment with said venturi outlet of said powder pumping chamber;

an inlet tube adapted to connect to the powder source, said inlet tube intersecting said powder pumping chamber at a location between said venturi outlet of said powder pumping chamber and said discharge outlet of said air chamber in said nozzle;

valve means located at said discharge outlet of said air chamber in said nozzle and movable between an open and closed position relative thereto for for periodically interrupting the passage of pressurized air through said discharge outlet in said nozzle into said powder pumping chamber to create intermittent pulses of pressurized air each having a substantially constant pressure for the duration of the pulse, said intermittent pulses being effective to withdraw powder material from the powder source through said inlet tube and into said powder pumping chamber to form pulses of air-entrained powder material having a substantially homogeneous air-to-powder density.

8. The apparatus of claim 7 in which said valve means comprises:

a seat mounted within said air chamber of said nozzle at said discharge outlet therein;

a plunger having a tip, said plunger being movable between an open position wherein said tip is spaced from said seat to permit the passage of pressurized air through said discharge outlet, and a closed position wherein said tip contacts said seat to seal said discharge outlet;

means for moving said plunger between said open and closed positions.

9. Apparatus for intermittently pumping powder material from a powder source, comprising:

a pump body formed with a pumping chamber having a powder inlet adapted to communicate with the powder source and a powder outlet;

a nozzle formed with an air chamber adapted to receive pressurized air, said air chamber being formed with a discharge outlet;

said nozzle being carried by said pump body so that said discharge outlet in said nozzle is positioned to eject pressurized air from said air chamber of said nozzle directly into said pumping chamber of said pump body which creates a suction in said pump body to draw particulate powder material from the powder source into said powder inlet of said pumping chamber and through said powder outlet thereof;

a seat mounted within said air chamber at said discharge outlet therein;

a plunger movable between an open and closed position with respect to said seat, said plunger disengaging said seat in said open position to permit the passage of pressurized air through said discharge outlet of said nozzle into said pumping chamber of said pump body, said plunger engaging said seat in said closed position to prevent the passage of pressurized air through said discharge outlet of said nozzle;

means for intermittently moving said plunger between said open and closed positions to form intermittent pulses of pressurized air which are discharged from said discharge outlet of said air chamber into said pumping chamber, each of said intermittent pulses of pressurized air having a substantially constant pressure for the duration of the pulse which forms intermittent pulses of air-entrained powder material having a substantially homogeneous air-to-powder density.

10. The apparatus of claim 9 in which said means for intermittently moving said plunger comprises:

an armature slidably mounted within said nozzle body, said armature being engagable with said plunger;

a solenoid operative to move said armature in a first direction, said armature being effective in the course of moving in said first direction to move said plunger to said open position;

a return spring connected to said plunger, said return spring being effective to move said plunger in a second direction to said closed position.

11. The apparatus of claim 10 in which said armature is formed with an annular shoulder and said plunger is formed with a ring, said annular shoulder being effective to engage said ring to move said plunger to said open position.

12. The apparatus of claim 11 in which said nozzle body includes a spring for biasing said armature to a first position when said plunger is in said closed position, said annular shoulder of said armature being spaced from said ring of said plunger with said armature in said first position.

13. A powder pump comprising:

a pump body having a cavity defining a venturi pumping chamber;

an air supply nozzle mounted within said body for supplying air to said venturi pumping chamber, said air supply nozzle having a discharge orifice in axial alignment with said venturi pumping chamber;

a powder supply conduit communicating with said venturi pumping chamber such that air-entrained powder may be drawn into said venturi pumping chamber by air flow through said chamber; and an air flow control valve mounted in said air supply nozzle closely adjacent to said discharge orifice of said nozzle, said air flow control valve including means for periodically interrupting the flow of pressurized air through said air supply nozzle to produce intermittent pulses of pressurized air within said venturi pumping chamber which draw powder material through said powder supply conduit and form pulses of air-entrained powder material within said venturi pumping chamber having a substantially homogeneous air-to-powder density.

14. The method of intermittently pumping powder material from a powder source, comprising:

supplying pressurized air into the air chamber of a nozzle communicating with the pump body of a powder pump;

ejecting pressurized air from a discharge outlet formed in the air chamber of the nozzle into a pumping chamber formed in said pump body to create a suction within said pumping chamber and within a suction tube extending between said pumping chamber and the powder source;

periodically interrupting the flow of pressurized air from said discharge outlet in said nozzle into said pumping chamber of said pump body to form intermittent pulses of pressurized air having a substantially constant pressure throughout the duration of the pulse, said intermittent pulses of pressurized air forming pulses of air-entrained powder material having a substantially homogeneous air-to-powder density.

15. The method of claim 14 in which said step of periodically interrupting the flow of pressurized air comprises intermittently moving a valve member between a closed position relative to said discharge outlet in said air chamber and an open position relative to said discharge outlet.

16. The method of intermittently pumping powder material from a powder source, comprising:

supplying pressurized air into the air chamber of a nozzle communicating with the pump body of a powder pump;

unseating a valve member from a seat located at the discharge outlet of said air chamber in said nozzle;

ejecting pressurized air from said discharge outlet of said nozzle into a pumping chamber formed in said pump body to create a suction within said pumping chamber and within a suction tube extending between said pumping chamber and the powder source; and intermittently returning said valve member into contact with said seat to terminate the flow of pressurized air from said discharge outlet of said air chamber in said nozzle into said pumping chamber in said pump body to form intermittent pulses of pressurized air each having a substantially constant pressure throughout the duration of the pulse, said intermittent pulses of pressurized air forming pulses of air-entrained powder material having a substantially homogeneous air-to-powder density.

17. The method of intermittently pumping powder material from a powder source, comprising:

maintaining substantially constant air pressure within an air chamber formed in a nozzle which is carried by the pump body of a powder pump;

intermittently ejecting pressurized air through a discharge outlet in the air chamber of the nozzle into a pumping chamber formed in the pump body to form intermittent pulses of pressurized air within the pumping chamber each having a substantially constant pressure throughout the duration of the pulse, the intermittent pulses of pressurized air each creating a suction force within the pumping chamber which is effective to withdraw powder material from the powder source into the pumping chamber of the powder pump to form pulses of air-entrained powder material having a substantially homogeneous air-to-powder density.

18. A method of intermittently pumping powder material from a powder source, comprising:

supplying pressurized air into the air chamber of a nozzle carried in the pump body of a powder pump;

ejecting pressurized air from a discharge outlet formed in the air chamber of the nozzle into a pumping chamber formed in the pump body;

intermittently withdrawing pulses of air-entrained powder material from the powder source into the pumping chamber each having a substantially homogeneous air-to-powder density by periodically interrupting the flow of pressurized air from the discharge outlet of the nozzle into the pumping chamber of the pump body.

19. The method of claim 18 in which said step of intermittently withdrawing pulses of powder material from the powder source includes periodically interrupting the flow of pressurized air from the discharge outlet of the nozzle into the pumping chamber to form intermittent pulses of pressurized air within the pumping chamber each having a substantially constant pressure throughout the duration of the pulse.

* * * * *